(12) United States Patent
Van Der Spuy

(10) Patent No.: US 7,571,442 B2
(45) Date of Patent: Aug. 4, 2009

(54) SYSTEMS AND METHODS FOR APPLICATION PROGRAMMING USING PERSISTENT OBJECTS

(75) Inventor: Johannes C. Van Der Spuy, Pretoria (ZA)

(73) Assignee: Worldwide Objects International Limited, Guernsey Islands (GB)

( * ) Notice: Subject to any disclaimer, the term of this patent is extended or adjusted under 35 U.S.C. 154(b) by 376 days.

(21) Appl. No.: 10/204,543

(22) PCT Filed: Feb. 20, 2001

(86) PCT No.: PCT/IB01/00262

§ 371 (c)(1),
(2), (4) Date: Aug. 22, 2002

(87) PCT Pub. No.: WO01/63400

PCT Pub. Date: Aug. 30, 2001

(65) Prior Publication Data

US 2003/0023769 A1 Jan. 30, 2003

(30) Foreign Application Priority Data

Feb. 22, 2002 (GB) ................. 0004090.7

(51) Int. Cl.
*G06F 9/46* (2006.01)
*G06F 9/54* (2006.01)
(52) U.S. Cl. ..................... 719/315; 719/332
(58) Field of Classification Search ............. 719/315, 719/330, 332
See application file for complete search history.

(56) References Cited

U.S. PATENT DOCUMENTS

| 5,339,435 A | 8/1994 | Lubkin et al. |
| 5,361,360 A | 11/1994 | Ishigami et al. |
| 5,410,703 A | 4/1995 | Nilsson et al. |
| 5,428,792 A | 6/1995 | Conner et al. |
| 5,544,302 A | 8/1996 | Nguyen |
| 5,613,122 A | 3/1997 | Burnard et al. |
| 5,659,735 A | 8/1997 | Parrish et al. |
| 5,682,532 A | 10/1997 | Remington et al. |
| 5,701,472 A | 12/1997 | Koerber et al. |
| 5,764,989 A | 6/1998 | Gustafsson et al. |
| 5,822,580 A | 10/1998 | Leung |
| 5,872,974 A | 2/1999 | Mezick |
| 5,896,532 A | 4/1999 | Blewett |
| 5,949,972 A | 9/1999 | Applegate |
| 5,974,253 A | 10/1999 | Nahaboo et al. |
| 5,974,421 A * | 10/1999 | Krishnaswamy et al. 707/103 R |
| 6,018,628 A | 1/2000 | Stoutamire |
| 6,038,395 A | 3/2000 | Chow et al. |
| 6,093,215 A | 7/2000 | Buxton et al. |

(Continued)

FOREIGN PATENT DOCUMENTS

JP 08-234985 A 9/1996

(Continued)

*Primary Examiner*—Li B Zhen
(74) *Attorney, Agent, or Firm*—Foley & Lardner LLP

(57) ABSTRACT

An application programming system includes a number of processors operable to execute software processes, a communication channel between the number of processors, and a registry of object co-operable to create an executable software application. The objects have characteristics which are dynamically alterable at run-time without requiring recompilation of code and re-building of any software processes.

20 Claims, 6 Drawing Sheets

U.S. PATENT DOCUMENTS

| | | | |
|---|---|---|---|
| 6,119,122 A * | 9/2000 | Bunnell | 707/102 |
| 6,182,277 B1 | 1/2001 | DeGroot et al. | |
| 6,230,318 B1 | 5/2001 | Halstead et al. | |
| 6,243,764 B1 * | 6/2001 | Leach et al. | 719/316 |
| 6,260,187 B1 | 7/2001 | Cirne | |
| 6,324,590 B1 * | 11/2001 | Jeffords et al. | 719/316 |
| 6,351,843 B1 | 2/2002 | Berkley et al. | |
| 6,449,659 B1 | 9/2002 | Caron et al. | |
| 6,463,583 B1 | 10/2002 | Hammond | |
| 6,678,882 B1 * | 1/2004 | Hurley et al. | 717/121 |
| 6,694,506 B1 | 2/2004 | LeBlanc et al. | |
| 6,701,382 B1 * | 3/2004 | Quirt et al. | 719/316 |
| 6,868,454 B1 | 3/2005 | Kubota et al. | |
| 6,895,581 B1 | 5/2005 | Chkodrov et al. | |
| 6,940,912 B2 | 9/2005 | Sullivan et al. | |
| 6,966,054 B2 | 11/2005 | Simonyi | |
| 7,073,170 B2 | 7/2006 | Grier et al. | |
| 7,076,784 B1 * | 7/2006 | Russell et al. | 719/315 |
| 7,096,456 B2 | 8/2006 | Hanson et al. | |
| 7,099,886 B2 | 8/2006 | Lipe et al. | |
| 7,143,421 B2 | 11/2006 | Forin et al. | |
| 7,162,710 B1 | 1/2007 | Edwards et al. | |

FOREIGN PATENT DOCUMENTS

| | | |
|---|---|---|
| WO | WO 97/26597 A1 | 7/1997 |

* cited by examiner

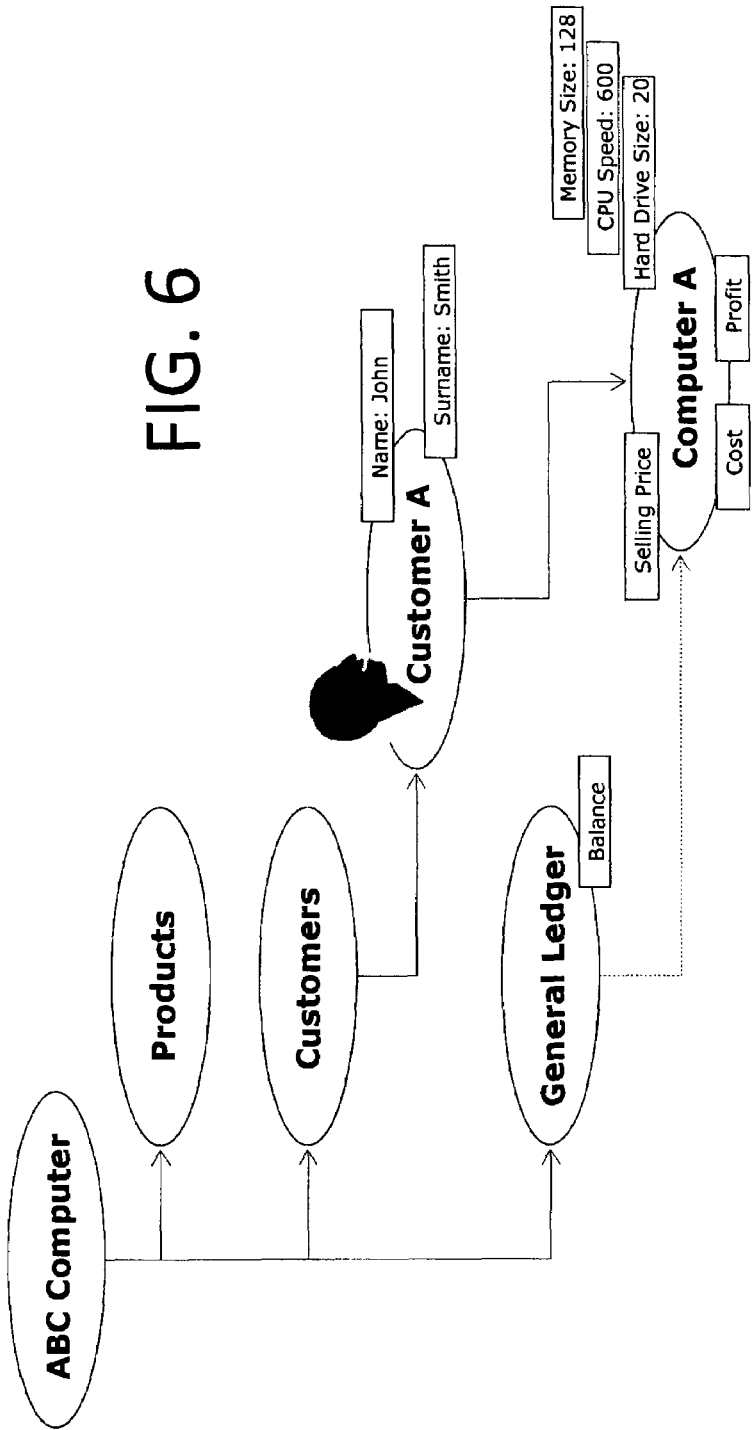

SYSTEMS AND METHODS FOR APPLICATION PROGRAMMING USING PERSISTENT OBJECTS

This application claims priority to PCT/IB01/00262, filed Feb. 20, 2001 and Great Britain Application No. 0004090.7, filed Feb. 22, 2000, the respective disclosures of which are hereby incorporated in their entirety as if fully set forth herein.

FIELD OF THE INVENTION

Embodiments of the invention relate to systems, methods and applications for programming and data management based on objects. Objects of the present embodiments have dynamic attributes and comprise data indicating their respective storage locations or the storage locations of other objects.

BACKGROUND TO THE INVENTION

The implementation of software applications based on object-oriented programming techniques is well known in the art and has been in widespread use since the late 1980's.

Although providing several noteworthy advantages over classical top-down programming techniques, it is acknowledged that applications based on object-oriented programming techniques are inefficient for a number of reasons:
1. traditional object-oriented applications require an underlying database structure to be designed and provided in order to support the application;
2. the objects which form the components of an application are local to that application only, without any relationship to extraneous objects or applications;
3. the object characteristics such as attributes, properties, inheritances and the like are static in nature. A change to any of these characteristics renders it necessary to recompile the affected objects and rebuild the application;
4. there is no global classification of objects, making it very difficult, if not impossible to construct applications which make use of objects which are distributed across a number of remote servers; and
5. the separation of objects and data necessitates the provision of separate facilities for data management and streaming of data to physical hardware devices.

It is desirable to provide an application programming system which allows the development of distributed object-oriented applications which are simple to adapt, modify and extend.

OBJECT OF THE INVENTION

It is an object of this invention to provide an application programming system, and a method of operation thereof which will, at least partially, alleviate the above mentioned difficulties and disadvantages.

SUMMARY OF THE INVENTION

In accordance with this invention there is provided an application programming system, comprising:
 a number of processors operable to execute software processes;
 a communication channel between the number of processors;
 a registry of objects co-operable to create an executable software application characterised in that the objects have a plurality of characteristics which are dynamically alterable at application run-time.

Further features of the invention provide for the registry to be accessible from any one of the number of processors, for the registry to include a unique key corresponding to each object registered therein, and for the registry to contain a definition of each object, including its abstraction and state.

Still further features of the invention provide for each processor to include an interaction manager process, for the interaction manager process to regulate the interaction between any object located on the processor, and hardware devices and resources associated with the processor, for the interaction manager process to serve any object associated with the particular processor with any one or more of persistence, execution, user representation and input and output facilities, and for the interaction manager process to provide a transport layer for distribution and communication of objects associated with various processors.

The invention extends to an object for use in the application programming system described above, for the object to have a number of dynamic characteristics which are alterable at run-time, for the dynamic characteristics to include any one or more of a name, and a location of the object on the application programming system, for the dynamic characteristics to also include any one or more of the state of the object, its containment, whether by value or by reference, a multiple inheritance hierarchy of the object, object data, memory, actions and user interface attributes, for each object to have a self-maintaining storage mechanism, for each object in the application programming system to be self-documenting, and for each object in the application programming system to have a code generator operable to enable the object to transform itself dynamically.

The invention extends still further to a method of operation of an application
 programming system, comprising the steps of:
 providing a number of processors operable to execute software processes;
 providing a communication channel between the number of processors;
 establishing a registry of objects co-operable to create an executable software application, the objects having a plurality of characteristics which are dynamically alterable at application run-time; and
 defining a relationship between a number of objects contained in the registry to create the software application.

There is further provided for accessing the registry from any one of the number of processors, for including in the registry a unique key corresponding to each object registered therein, and for configuring the registry to contain a definition of each object registered therein, including its abstraction and state.

There is still further provided for including an interaction manager process in each processor of the application programming system, for regulating, by means of the interaction manager process, the interaction between any object located on the processor, and hardware devices and resources associated with the processor, for serving, by means of the interaction manager process, any object associated with the particular processor with any one or more of persistence, execution, user representation and input and output facilities, and for providing, by means of the interaction manager process, a transport layer for distribution and communication of objects associated with various processors.

There is yet further provided for including in each registered object a number of dynamic characteristics which are alterable at run-time, for including as part of the dynamic characteristics any one or more of a name, and a location of the object on the application programming system, for also including as part of the dynamic characteristics any one or more of the state of the object, its containment, whether by value or by reference, a multiple inheritance hierarchy of the object, object data, memory, actions and user interface attributes, for providing each object with a self-maintaining storage mechanism, for structuring each object in the application programming system to be self-documenting, and for including in each object in the application programming system a code generator operable to enable the object to transform itself dynamically.

BRIEF DESCRIPTION OF THE DRAWINGS

One embodiment of the invention is described below, by way of example only, and with reference to the accompanying drawings, in which:

FIGS. 2 to 6 are representations of an application program implemented by means of the application programming system of FIG. 1.

DETAILED DESCRIPTION OF THE PREFERRED EMBODIMENTS

Figure 1:
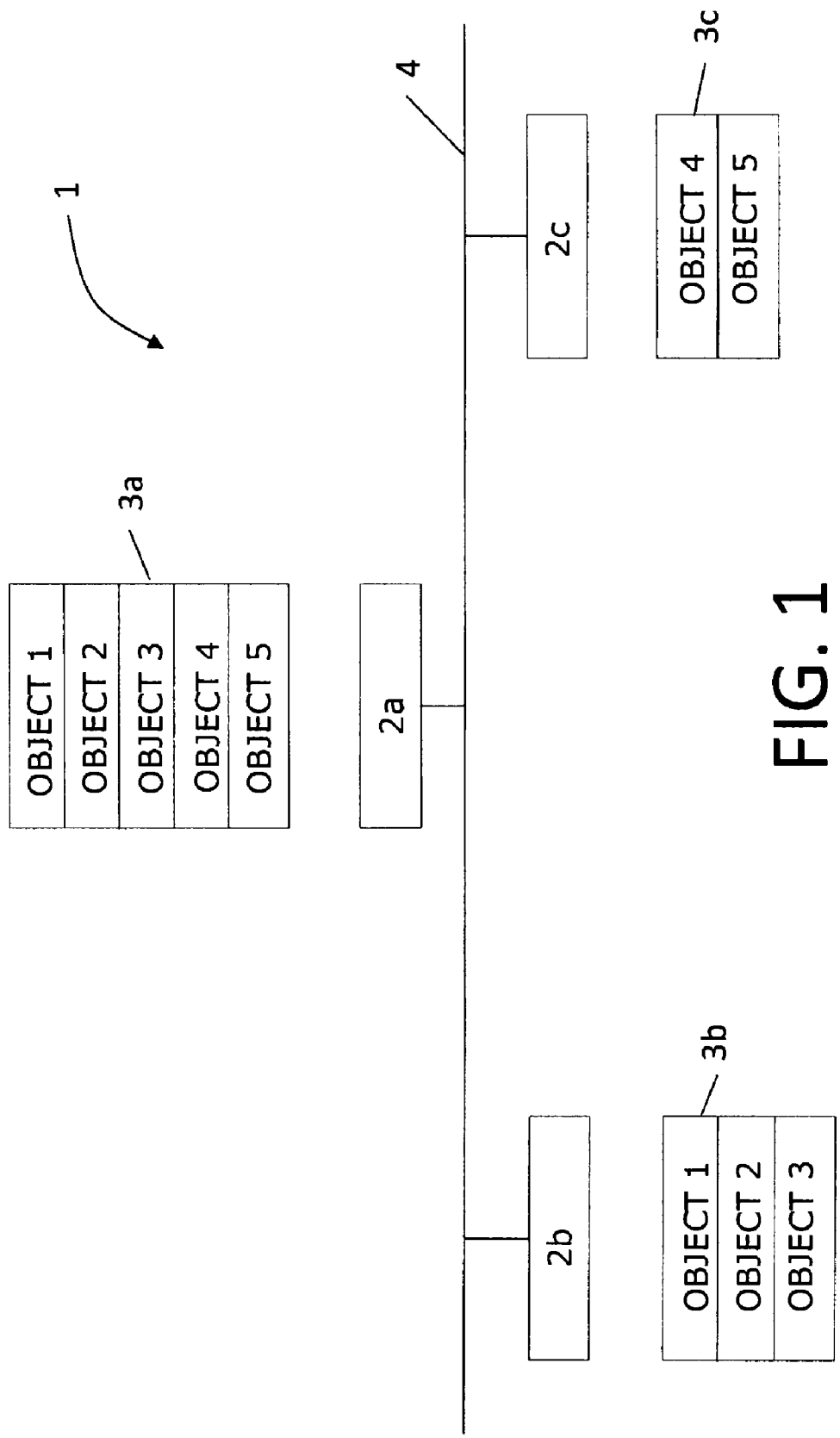
FIG. 1 is a functional block diagram of an application programming system according to the invention.
Figure 2:
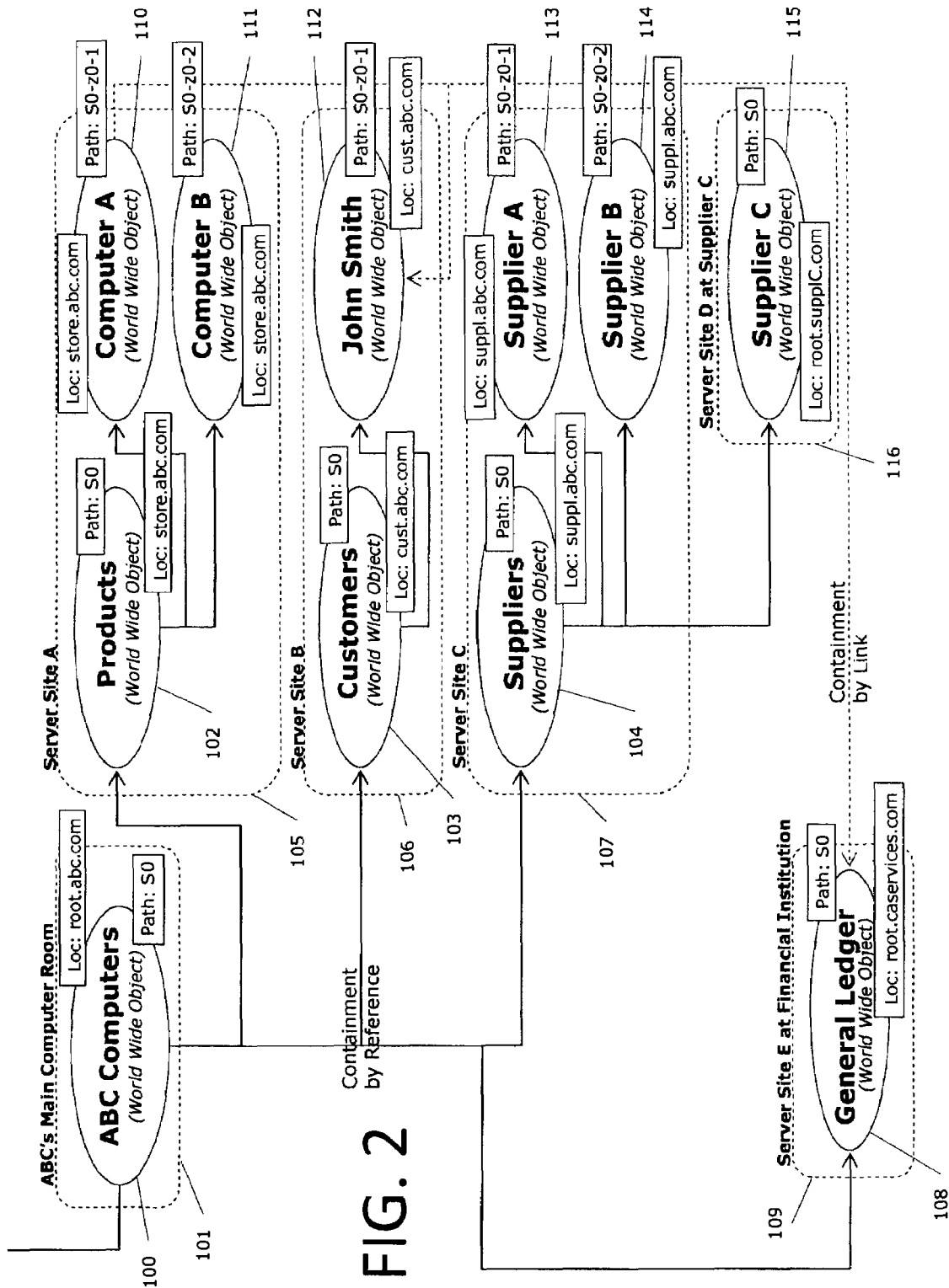
Figure 3:
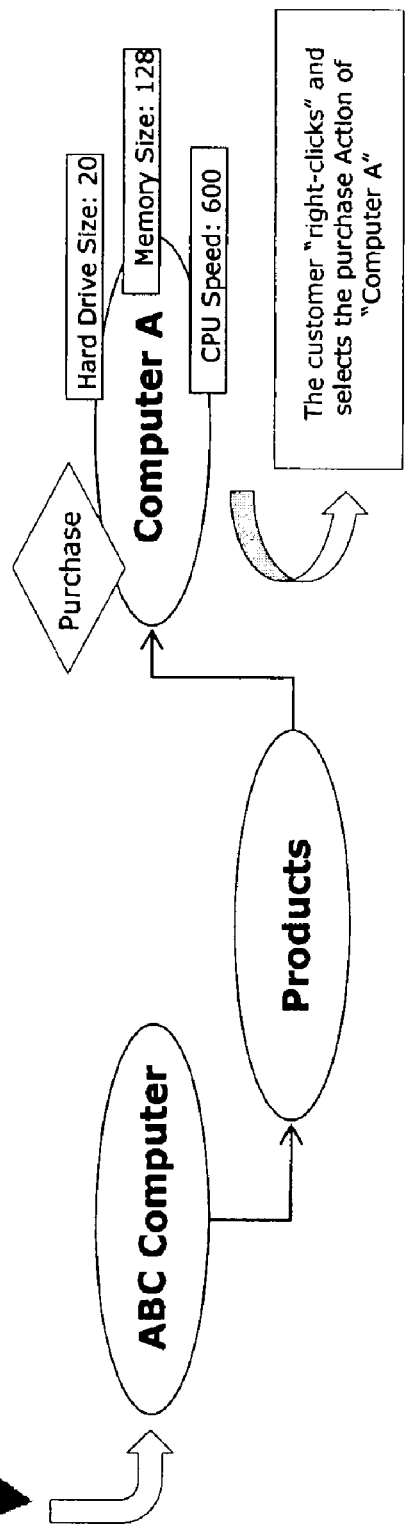
Figure 4:
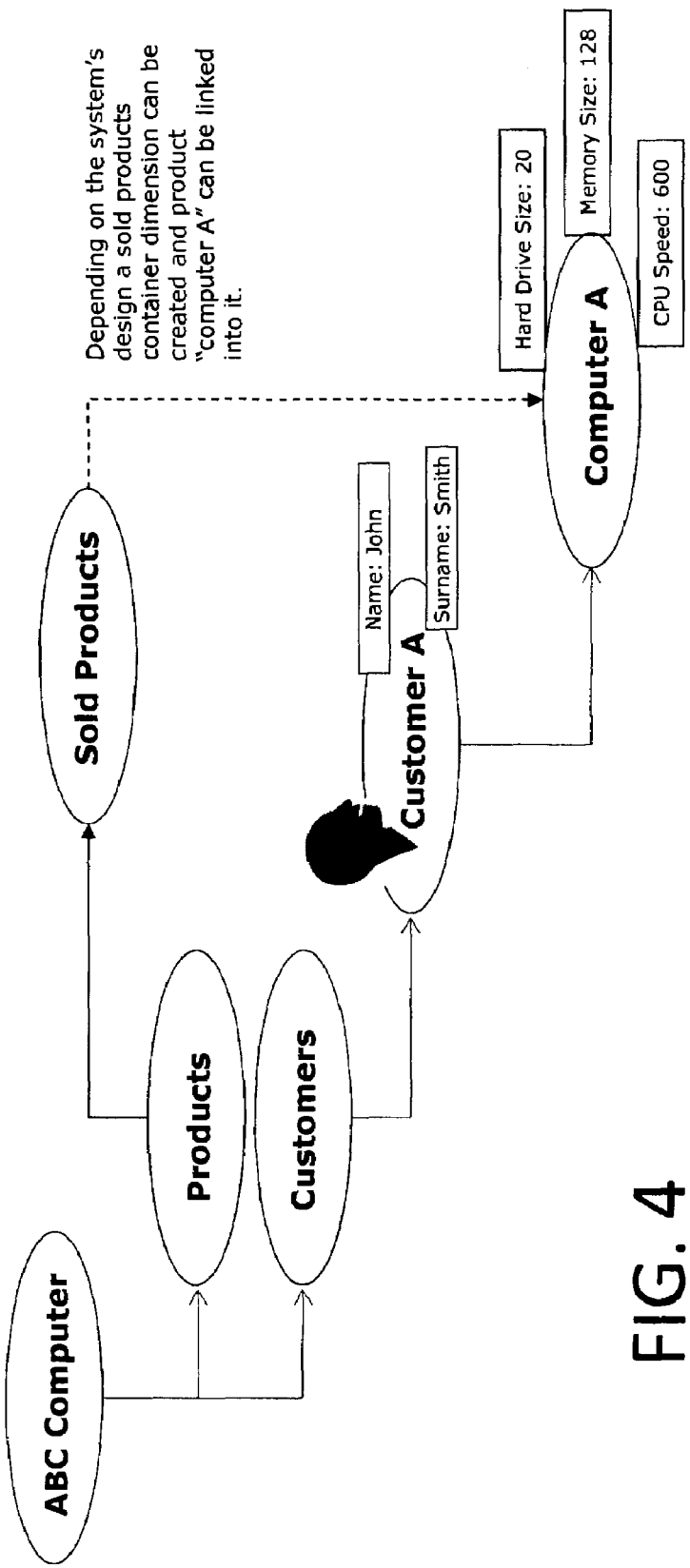
Figure 5:
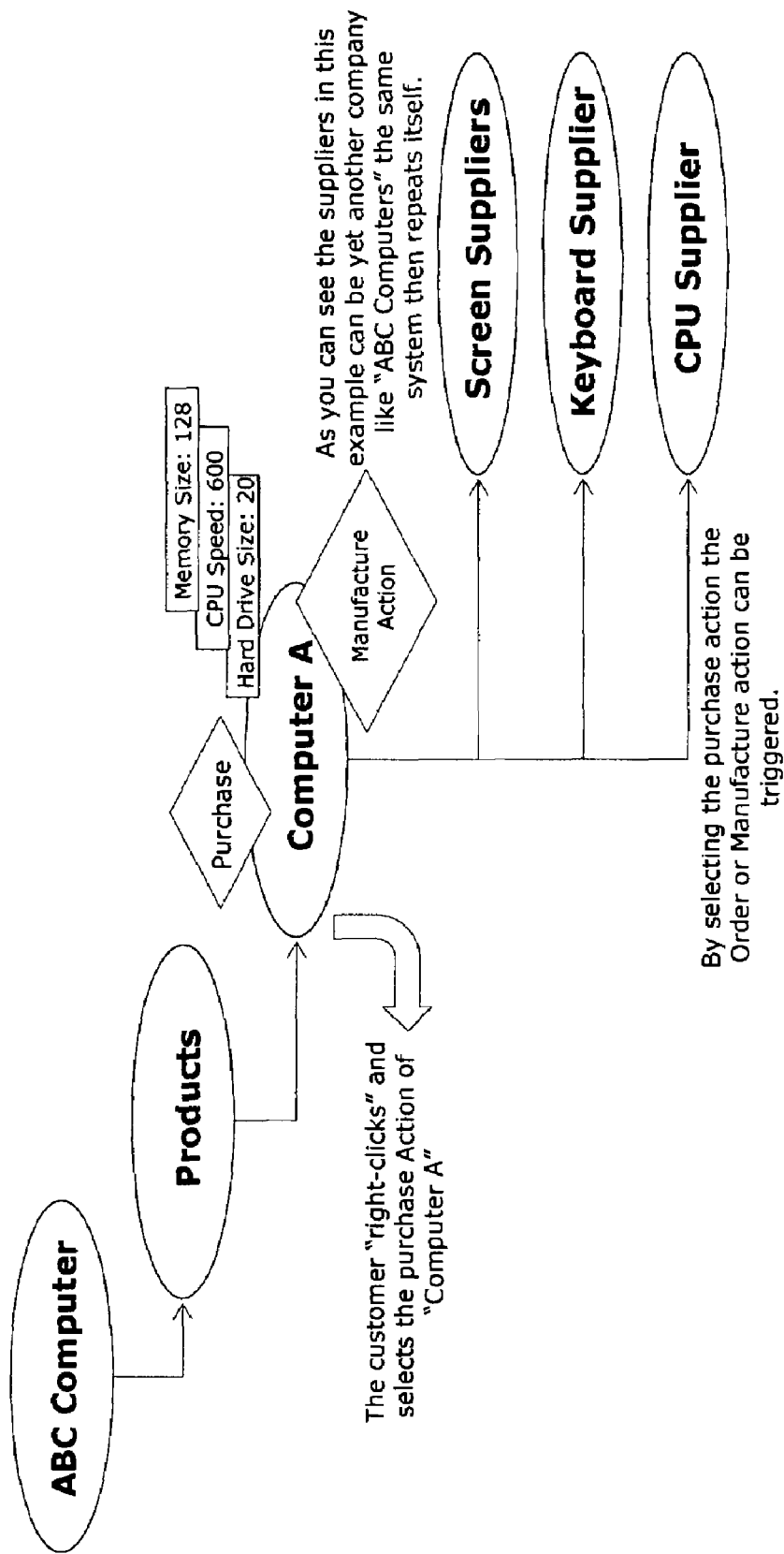

Referring to FIGS. 1 to 6, in which like features of the invention are implemented by like numerals, an application programming system is indicated generally by reference numeral (1).

The application programming system (1) comprises a number of processors (2a, 2b and 2c) operable to execute software processes thereon and a communication channel (4), in this embodiment a wide area network (WAN), between the processors. Each processor (2a, 2b and 2c) has a registry (3a, 3b and 3c) of objects associated with that particular processor. The objects in the various registries (3a, 3b and 3c) are of a type well known and commonly applied in the technique of object-oriented programming which is widely utilised in the development of software applications. The objects in the various registries (3a, 3b and 3c) are co-operable with each other to create an executable software application.

One processor (2a) is designated as the root object server, and its registry contains details of all objects listed in the registries (3a, 3b and 3c) of all the processors (2a, 2b and 2c) in the network.

The objects listed in the various registries (3a, 3b and 3c) are distinguished from prior art objects in that they have a plurality of additional characteristics, some of which are dynamically alterable at application run-time. These additional characteristics will be outlined in detail below.

1. Additional Characteristics
   1.1 Global Unique Object Classification & Definition
   The registry (2a, 2b or 2c) includes a unique key corresponding to each object registered therein. The unique key corresponding to an object allows for the global publishing of an object's specialization and an aggregation hierarchy of its abstractions. This information can be requested from the object root server (2a) by using the object's unique key. The published object definition determines the specifics of its abstraction and state.
   In short the unique key is the publishing method to determine an object's generalization, specialization, mechanisms and how objects collaborate.
   1.2 Dynamic Name
   The name of an object, which can be changed at execution time.
   1.3 Dynamic Location
   The location of each object is stored as an object characteristic, usually as a network address, thereby enabling each object to be aware of its location on a global basis. The location format depends on the type of network transport layer or protocol being used in the application programming system (1). The object keeps as many locations as there are transport layers used to access the object. The location(s) of an object can be changed at execution time, in which instance the object will relocate itself to a new location leaving a trace to its new location, in order to resolve relationships that previously may have been defined or created.
   1.4 Internal Object Path
   This is an internally used path used to determine the absolute relations of each level of hierarchical containment between objects.
   1.5 Events
   Dynamic methods which may alter the states of both the essential and the dynamic characteristics, should the state of any object change.
2. Dynamic Characteristics
   2.1 Properties
   This is a dynamic collection of the state of the object, in the form of collection of data structures, containing the name and data for each state, which is stored using the persistence property of the object
   2.2 Dynamic Object Containment
   Dynamic object containment allows the dynamic definition of an object's aggregation. It consists of a vector of data structures, each containing flags and identification information to determine the internal object path of the contained object. The flags define the various forms of containment. The vector of data is stored using the persistence property of the object.
   An object supports various forms of containment:
      2.2.1 Dynamic Containment by Value
      In this case an object contains other objects, thereby imparting characteristics and states to the contained objects. A contained object therefore is dependent on its enclosing object.
      2.2.2 Dynamic Containment by Reference
      In this instance of containment, the containing object denotes homogeneous and heterogeneous collections of objects, which designate the aggregation of the containing object. (that is, a containing object can hold different types of objects in either a "owner" or "linked" relationship and keep track of "linked" sources and destinations.
   2.2 Dynamic Multiple Inheritance (DMI)
   This is a vector keeping track of other objects that form part of the object's abstraction. This multiple inheritance hierarchy and abstraction of an object can be defined at execution time.
   2.4 Dynamic Object Data (DOD)
   This is the encapsulated information of an object that defines or summarizes an object's current state.
   2.5 Memory
   An object can keep track of all its state and abstraction changes over any defined time and/or space. This means an object memorizes all state changes and activities over a defined time and/or space which provides for the implementation of a Point-In-Time Status, which recalls the state of the object at any point in time.

2.6 Actions

Actions are dynamically defined methods that define the operations that can be performed on an object. Actions can be altered, added or removed at execution time. Each action can have dynamically defined parameters that serve as input and output (resulting) information to the operation. An action is changed dynamically on interaction with another object or by interaction with a user interface. On saving, the change is processed into an executable form, after which the object is available in its metamorphic form.

2.7 Dynamic User Interface Attributes

This provides information needed for an object to interact with the user via the client application. These attributes have multiple layers to interact with multiple client-specific interfaces. These attributes serve as a representation of the object in any required client-specified form.

Each object in the application programming system (1) has a self-maintaining storage mechanism that allows for distributed serialized storage, referred to as the persistence mechanism of an object in the application system. Further, an object can document its abstraction for review. This information includes all object properties, states, actions etc. that encapsulate its abstraction.

The application programming system (1) implements a code generator which is incorporated within each object to enable the object to transform itself dynamically.

It will be appreciated by those skilled in the art that the objects envisaged in this embodiment of the application programming system (1) are intelligent, as envisaged by the characteristics of Dynamic Entity and Action Abstraction, living, as evidenced by the characteristics of Location, Persistence and Dynamic Abstraction, and exhibit total recall, as seen in the characteristics of Memory and, in particular, Point-In-Time Status.

Each processor (2a, 2b and 2c) of the application programming system (1) may include interaction manager process (10). The interaction manager process is the kernel for serving operations of an object and regulates the interaction between the object located on the processor, and hardware devices and resources associated with the processor. The purpose of the interaction manager process is to serve any object associated with the particular processor with any one or more of persistence, execution, user representation and input and output facilities. Since objects are the building blocks for applications it is not the purpose of the kernel to provide applications, but merely to manage and balance the hardware interaction with objects. It also provides transport layers for distribution and communication of objects, both remotely and locally, meaning that it can balance its tasks between different processors running the interaction manager process. It also provides base objects that can be dynamically inherited to interact with the object's dynamic user interface attributes.

It will be further appreciated by those skilled in the art that the application programming system described above enables the implementation of distributed applications, even having a global scope. Thus applications can be constructed by using objects from servers that are distributed across the world. This is possible because individuals across the world can classify specialised objects to serve a specific purpose. Each individual will then publish on the root server (2a) the classification of objects they have developed, and upload the developed objects. The published information and objects are then available for anyone else who needs to use any of these objects for whatever purpose, just as one would use software modules from a library or libraries, as is known in the prior art.

The invention may be further understood with reference to a particular application implemented on the application programming system (1). The application relates to an administration system for a business enterprise called ABC Computers which is a supplier of computer hardware and will be described with reference to FIGS. 2 to 6.

The application is based on an object (100) called "ABC Computers" which is located on a root server (101) in the computer room at ABC Computer's premises. This root object (100) contains 3 further objects, namely "Products" (102), "Customers" (103) and "Suppliers" (104). These three contained objects are located on servers (105, 106 and 107) at different server sites A, B and C, respectively. The root object (100) also contains a fourth object "General Ledger" (108) located on a server at a server site E (109) belonging to a financial institution.

The "Products" object (102) contains other objects labeled "Computer A" (110) and "Computer B" (111) relating to different hardware products sold by the business enterprise. These objects (110) and (111) are located on the same server (105). Similarly, the "Customers" object (103) contains a further object called "John Smith" (112) located on the same server (106). Lastly, the object "Suppliers" (104) located on server (107) contains three objects called "Supplier A" (113), Supplier B" (114) and "Supplier C" (115). Of these, objects (113) and (114) are located on the same server (107) as the object "Suppliers" (104), whilst the object "Supplier C" (115) is located on a different server D (116).

In this manner, by defining the containment of each object, it is possible to create distributed applications in the manner described in the above example.

FIGS. 3 to 6 show the interaction between the different objects of the ABC Computers example in respect of a product sale, establishment of a new customer, the placing of a back order on suppliers, and the interaction with an accounting function, respectively. These interactions will not be described here in detail.

The invention therefore provides a simple and effective application programming system (1) for the implementation of distributed applications.

The invention claimed is:

1. A system, comprising:

a processor operable to execute a software process;

an interaction manager process operating on the processor;

a first plurality of objects comprising executable actions;

a second plurality of objects comprising non-executable data;

wherein the first plurality of objects comprising executable actions is executable by the interaction manager and thereby co-operable to form an executable software application using non-executable data of the second plurality of objects, wherein each of the plurality of objects comprises data that indicates the object's storage location;

wherein the data that indicates the object's storage location comprises a network address of a processor where the object is located and a path to a persistent storage location of the object at that processor;

wherein at least one of the first or second plurality of objects further comprises a registry, the registry comprising the data that indicates the storage location of the at least one of the plurality of objects; the registry further comprising data indicating the storage location of a second one of the plurality of objects;

wherein the registry comprises a unique key corresponding to each object whose storage location is indicated by data therein; and wherein the at least one of the first or second plurality of objects further comprises a definition of the at least one of the plurality of objects, including an abstraction and a state.

2. The system as claimed in claim 1, further comprising a second processor comprising an interaction manager process.

3. The system as claimed in claim 2, wherein the processor and second processor each comprise at least one microprocessor, an associated storage system, associated hardware devices and associated resources, and wherein each interaction manager process regulates the interaction between any object stored at a respective processor, and the respective associated hardware devices and respective associated resources.

4. The system as claimed in claim 3, wherein the interaction manager process of the second processor functions to receive a request from the processor that an executable object associated with the second processor be invoked, and acts to invoke the executable object associated with the second processor.

5. The system as claimed in claim 1, further comprising an object wherein the object has a plurality of characteristics which are dynamically alterable at application run-time.

6. The object as claimed in claim 5, wherein the characteristics which are dynamically alterable at application run-time include any one or more of a name or a location of the object on the system.

7. The object as claimed in claim 6, wherein the characteristics which are dynamically alterable at application run-time also include any one or more of the state of the object, its containment, whether by value or by reference, a multiple inheritance hierarchy of the object, object data, memory, executable code or user interface attributes.

8. The object as claimed in claim 5, wherein the object has a self-maintaining storage mechanism.

9. The object as claimed in claim 5, wherein the object comprises information that allows it to be queried about one or more of its characteristics.

10. The object as claimed in claim 5, wherein the object includes a code generator operable to enable the object to transform itself dynamically.

11. A method, comprising:
providing a processor operable to execute a software process;
providing an interaction manager process operating on the processor;
providing a first plurality of objects comprising executable actions;
providing a second plurality of objects comprising non-executable data;
wherein the first plurality of objects comprising executable actions is executable by the interaction manager and thereby co-operable to form an executable software application using non-executable data of the second plurality of objects, wherein each of the plurality of objects comprises data that indicates the object's storage location; and wherein the data that indicates the object's storage location comprises a network address of a processor where the object is located and a path to a persistent storage location of the object at that processor;

wherein at least one of the first or second plurality of objects further comprises a registry, the registry comprising the data that indicates the storage location of the at least one of the plurality of objects; the registry further comprising data indicating the storage location of a second one of the plurality of objects; and further comprising including in the registry a unique key corresponding to each object whose storage location is indicated by data therein; and configuring the at least one of the first or second plurality of objects to comprise a definition of the at least one of the plurality of objects, including an abstraction and a state.

12. The method as claimed in claim 11, further comprising providing a second processor comprising an interaction manager process.

13. The method as claimed claim 12, wherein the processor and second processor each comprise at least one microprocessor, an associated storage system, associated hardware devices and associated resources, and wherein the method further comprises regulating, by means of each interaction manager process, the interaction between any object stored at a respective processor, and the respective hardware devices and respective resources.

14. The method as claimed in claim 13, further comprising sending, from the first processor, a request to the interaction manager process of the second processor that an object associated with the second processor be invoked, and thereafter invoking said object associated with the second processor by the interaction manager process of the second processor.

15. The method according to claim 11, wherein each of the plurality of objects has at least one characteristic which is dynamically alterable at application run-time.

16. The method as claimed in claim 15, wherein characteristics of the objects which are dynamically alterable at application run-time include one or more of a name or a location of the object.

17. The method as claimed in claim 16, wherein characteristics which are dynamically alterable at application run-time also include any one or more of the state of the object, its containment, whether by value or by reference, a multiple inheritance hierarchy of the object, object data, memory, executable code or user interface attributes.

18. The method as claimed in claim 15, wherein each object is provided with a self-maintaining storage mechanism.

19. The method as claimed in claim 15, wherein each object comprises information that allows it to be queried about one or more of its characteristics.

20. The method as claimed in claim 15, further comprising including in each object a code generator operable to enable the object to transform itself dynamically.

* * * * *

UNITED STATES PATENT AND TRADEMARK OFFICE
CERTIFICATE OF CORRECTION

PATENT NO.        : 7,571,442 B2                                            Page 1 of 1
APPLICATION NO.   : 10/204543
DATED             : August 4, 2009
INVENTOR(S)       : Van Der Spuy It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 376 days Delete the phrase "by 376 days" and insert -- by 814 days --

Signed and Sealed this

Twenty-fourth Day of August, 2010

David J. Kappos
*Director of the United States Patent and Trademark Office*